(12) United States Patent
Yoshida et al.

(10) Patent No.: US 11,401,355 B2
(45) Date of Patent: Aug. 2, 2022

(54) ETHYLENE-VINYL ALCOHOL COPOLYMER, METHOD OF PRODUCING ETHYLENE-VINYL ALCOHOL COPOLYMER, RESIN COMPOSITION, AND MULTILAYER STRUCTURE

(71) Applicant: THE NIPPON SYNTHETIC CHEMICAL INDUSTRY CO., LTD., Osaka (JP)

(72) Inventors: Tomonori Yoshida, Osaka (JP); Nobuaki Sato, Osaka (JP); Masahiko Taniguchi, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/913,069

(22) Filed: Mar. 6, 2018

(65) Prior Publication Data
US 2018/0194876 A1 Jul. 12, 2018

Related U.S. Application Data

(63) Continuation of application No. PCT/JP2016/076899, filed on Sep. 13, 2016.

(30) Foreign Application Priority Data

Sep. 15, 2015 (JP) .............................. JP2015-181881

(51) Int. Cl.
| | |
|---|---|
| *C08F 8/16* | (2006.01) |
| *C08F 216/06* | (2006.01) |
| *C08F 8/12* | (2006.01) |
| *B32B 27/28* | (2006.01) |
| *C08F 210/02* | (2006.01) |

(52) U.S. Cl.
CPC .............. *C08F 8/16* (2013.01); *B32B 27/28* (2013.01); *C08F 8/12* (2013.01); *C08F 210/02* (2013.01); *C08F 216/06* (2013.01); *C08F 2800/10* (2013.01); *C08F 2810/40* (2013.01)

(58) Field of Classification Search
CPC .............. C08F 216/06; C08F 8/16; C08F 8/48
See application file for complete search history.

(56) References Cited

U.S. PATENT DOCUMENTS

| | | | |
|---|---|---|---|
| 2001/0007004 A1 | 7/2001 | Nagao et al. | |
| 2007/0106031 A1 | 5/2007 | Uchiumi et al. | |
| 2014/0213701 A1 | 7/2014 | Nonaka et al. | |
| 2015/0140247 A1* | 5/2015 | Shibutani | ................ C08L 27/18 |
| | | | 428/36.91 |
| 2017/0335362 A1* | 11/2017 | Ono | ........................ C12P 33/20 |

FOREIGN PATENT DOCUMENTS

| | | |
|---|---|---|
| JP | 2001-163921 A | 6/2001 |
| JP | 2002-80606 A | 3/2002 |
| TW | 201307399 A | 2/2013 |
| WO | 2004/092234 A1 | 10/2004 |
| WO | 2013/005807 A1 | 1/2013 |
| WO | WO 2014/021422 * | 1/2013 |

OTHER PUBLICATIONS

International Search Report from Patent Application No. PCT/JP2016/076899, dated Dec. 20, 2016, along with an English translation thereof.

International Preliminary Report on Patentability from Patent Application No. PCT/JP2016/076899, dated Mar. 20, 2018, along with an English translation thereof.

JP Office Action, Japanese Patent Application No. 2016-557158, dated Oct. 29, 2019, with English translation.

TW Office Action, Taiwan Patent Application No. 105129680, dated Jul. 31, 2020, English translation.

* cited by examiner

*Primary Examiner* — Jeffrey C Mullis

(74) *Attorney, Agent, or Firm* — Greenblum & Bernstein, P.L.C.

(57) ABSTRACT

An ethylene-vinyl alcohol copolymer has an ethylene content of 20 to 60 mol % and includes a carboxylic acid group and a lactone ring group present at terminals thereof, wherein the molar concentration (Y/Z) of a lactone ring molar content (Y) to a sum (Z) of a carboxylic acid molar content (X) and the lactone ring molar content (Y) is not less than 58 mol %. The ethylene-vinyl alcohol copolymer is excellent in high-temperature thermal stability substantially without thermal decomposition, and is free from odor emanation and coloration even if being processed at a higher temperature.

11 Claims, 2 Drawing Sheets

ETHYLENE-VINYL ALCOHOL COPOLYMER, METHOD OF PRODUCING ETHYLENE-VINYL ALCOHOL COPOLYMER, RESIN COMPOSITION, AND MULTILAYER STRUCTURE

RELATED APPLICATION

This application is a continuation of International Application No. PCT/JP2016/76899, filed on Sep. 13, 2016, which claims priority to Japanese Patent Application No. 2015-181881, filed on Sep. 15, 2015, the entire contents of each of which are hereby incorporated by reference.

TECHNICAL FIELD

The present disclosure relates to an ethylene-vinyl alcohol copolymer and, more specifically, to an ethylene-vinyl alcohol copolymer excellent in gas barrier property and thermal stability at a higher temperature, and a production method therefor. The present disclosure further relates to a resin composition prepared by using the copolymer, and a multilayer structure.

BACKGROUND ART

Ethylene-vinyl alcohol copolymers (hereinafter abbreviated to EVOH), particularly, saponified ethylene-vinyl acetate copolymers, are excellent in gas barrier property, mechanical strength and other properties and, therefore, are used for films, sheets, containers, fibers and other various applications.

Such a saponified ethylene-vinyl acetate copolymer is prepared by copolymerizing ethylene and vinyl acetate, removing unreacted vinyl acetate, and saponifying the resulting ethylene-vinyl acetate copolymer.

With the use of the EVOH, a variety of formed or molded products are produced by melt-forming/molding processes such as extrusion and injection molding. When the EVOH is melt-formed or molded, the temperature for the melt-forming or molding is high, typically 200° C. or higher. Therefore, the EVOH is liable to be thermally degraded, so that the resulting formed or molded product has a poorer quality including fish eyes and hard spots.

An exemplary method for suppressing thermal degradation of the EVOH at the higher temperature is proposed, in which the total molar content of a carboxylic acid unit and a lactone ring unit at polymer terminals of the EVOH is controlled to not greater than 0.12 mol % with respect to the total molar content of an ethylene unit, a vinyl alcohol unit and a vinyl ester unit in the EVOH (see, for example, PTL 1).

RELATED ART DOCUMENT

Patent Document

PTL 1: WO2004/092234

SUMMARY OF INVENTION

The art disclosed in PTL 1 provides a thermal degradation-suppressing effect, but the evaluation of the resulting film is performed by sampling the film after a lapse of 50 hours and visually checking the film for gel-like spots. With recent advancement in technologies, the EVOH requires further improvement. For example, there is a demand for an EVOH that is less susceptible to thermal decomposition at a higher temperature and is free from odor emanation and coloration even if being processed at a higher temperature.

In view of the foregoing, the present disclosure provides an EVOH that is excellent in high-temperature thermal stability substantially without thermal decomposition and is free from odor emanation and coloration even if being processed at a higher temperature.

The inventors conducted intensive studies in view of the foregoing and, as a result, found that an EVOH excellent in high-temperature thermal stability and free from odor emanation and coloration even if being processed at a higher temperature can be provided by introducing a greater amount of the lactone ring unit than the carboxylic acid unit to terminals of the EVOH.

According to an inventive aspect, there is provided an EVOH comprising an ethylene unit and a vinyl alcohol unit as monomer units, and a carboxylic acid group and a lactone ring group present at terminals thereof, wherein the molar concentration (Y/Z) of a lactone ring molar content (Y) to the sum (Z) of a carboxylic acid molar content (X) and the lactone ring molar content (Y) is not less than 58 mol %.

According to another inventive aspect, there are provided a resin composition containing the EVOH, and a multilayer structure including at least one layer comprising the EVOH or the resin composition.

According to further another inventive aspect, there is provided a method of producing the EVOH, the method including: [I] a saponification step of saponifying an ethylene-vinyl ester copolymer to provide an EVOH intermediate product; [II] a chemical treatment step of chemically treating the EVOH intermediate product with a chemical treatment liquid; and [III] a drying step of drying the chemically treated EVOH intermediate product; wherein the weight-based ratio of a monovalent carboxylic acid concentration to a metal ion concentration (monovalent carboxylic acid concentration/metal ion concentration) is not less than 13 in the chemical treatment liquid in the chemical treatment step [II].

According to the present disclosure, the lactone ring group is present in a greater amount than the carboxylic acid group at the terminals of the EVOH. Thus, the EVOH is excellent in high-temperature thermal stability, and is free from odor emanation and coloration even if being processed at a higher temperature. The inventive EVOH is defined as a final product.

Where the sum (Z) of the carboxylic acid molar content (X) and the lactone ring molar content (Y) is 0.01 to 0.3 mol % based on the total amount of the monomer units of the EVOH, the EVOH is better in thermal stability.

Where the lactone ring molar content (Y) is 0.01 to 0.3 mol % based on the total amount of the monomer units of the EVOH, the EVOH is better in heat resistance.

Where the carboxylic acid molar content (X) is 0.01 to 0.3 mol % based on the total amount of the monomer units of the EVOH, the EVOH is better still in heat resistance.

According to the present disclosure, the EVOH producing method includes: [I] the saponification step of providing the EVOH intermediate product; [II] the chemical treatment step of chemically treating the EVOH intermediate product with the chemical treatment liquid; and [III] the drying step of drying the chemically treated EVOH intermediate product; wherein the weight-based ratio of the monovalent carboxylic acid concentration to the metal ion concentration (monovalent carboxylic acid concentration/metal ion concentration) is not less than 13 in the chemical treatment liquid in the chemical treatment step [II]. Therefore, it is possible to produce an EVOH excellent in high-temperature thermal stability and free from odor emanation and coloration even if being processed at a higher temperature.

The chemical treatment step [II] of chemically treating the EVOH intermediate product with the chemical treatment liquid may include a multi-stage chemical treatment step of preparing a plurality of chemical treatment liquids having different monovalent carboxylic acid concentrations, and chemically treating the EVOH intermediate product with the respective chemical treatment liquids on multiple stages, wherein the weight-based ratio of the monovalent carboxylic acid concentration to the metal ion concentration (monovalent carboxylic acid concentration/metal ion concentration) is not less than 13 in a chemical treatment liquid having the highest monovalent carboxylic acid concentration among the plurality of chemical treatment liquids. In this case, it is possible to efficiently produce an EVOH excellent in high-temperature thermal stability.

Where a drying temperature is 80° C. to 150° C. in the drying step [III], it is possible to efficiently produce an EVOH free from coloration.

DESCRIPTION OF EMBODIMENTS

Figure 1:
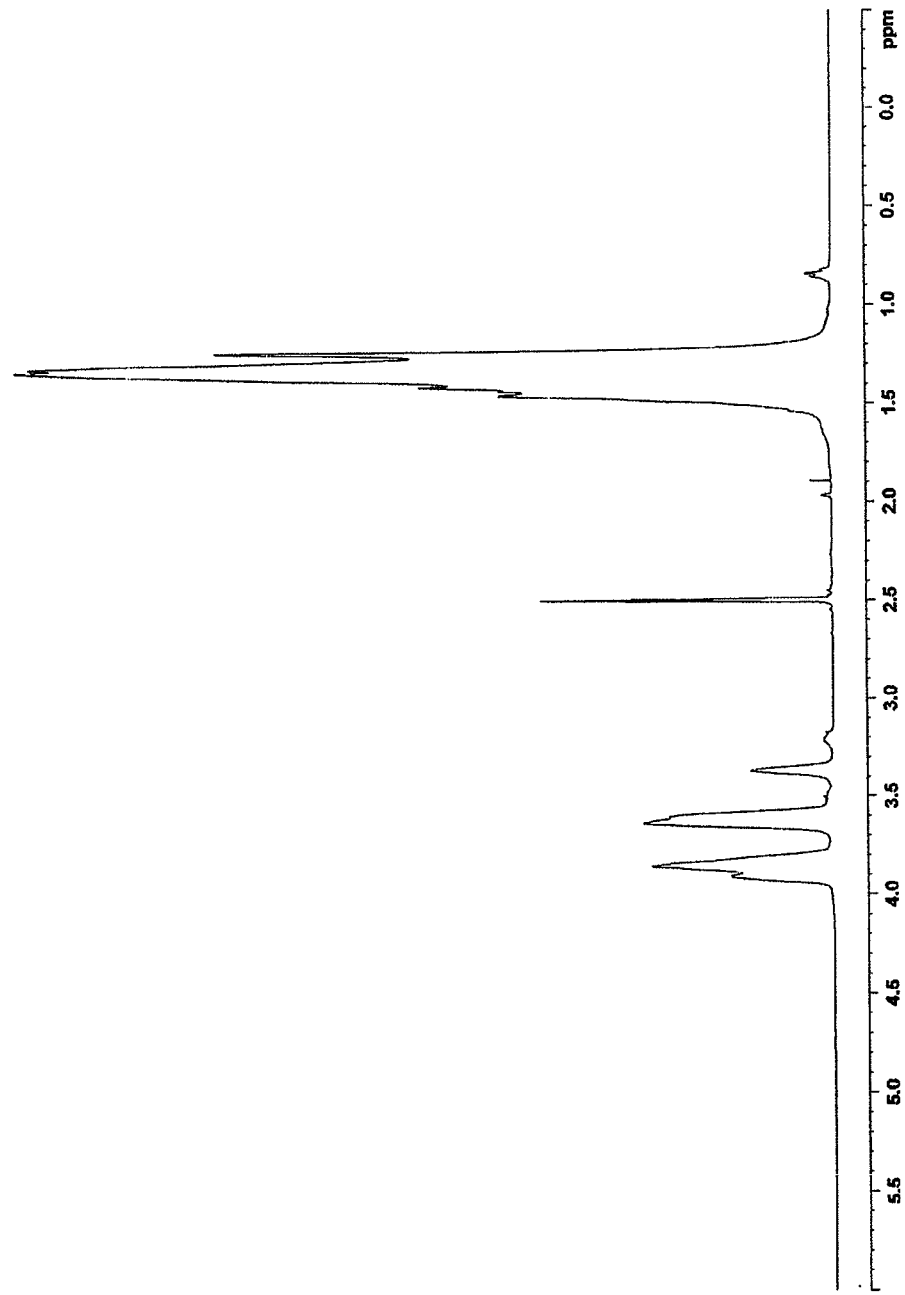
FIG. 1 is a typical $^1$H-NMR chart of an EVOH in a DMSO solvent.

Details of the present disclosure will hereinafter be described.

An inventive EVOH contains at least an ethylene unit and a vinyl alcohol unit as monomer units, and a carboxylic acid group and a lactone ring group present at terminals thereof, wherein the molar concentration (Y/Z) of a lactone ring molar content (Y) to the sum (Z) of a carboxylic acid molar content (X) and the lactone ring molar content (Y) is not less than 58 mol %.

The inventive EVOH is typically produced by copolymerizing an ethylene monomer and a vinyl ester monomer, and then saponifying the resulting copolymer. The EVOH is water-insoluble and thermoplastic. Any of conventionally known polymerization methods such as a solution polymerization method, a suspension polymerization method and an emulsion polymerization method may be used. A solution polymerization method using a lower alcohol such as methanol or ethanol as a solvent is typically employed, and a solution polymerization method using methanol as a solvent is preferably employed. A conventionally known method may be employed for the saponification of the resulting ethylene-vinyl ester copolymer.

That is, an EVOH (intermediate product) to be used as a material in the present disclosure mainly contains an ethylene structural unit and a vinyl alcohol structural unit, and further contains a small amount of a vinyl ester structural unit left unsaponified.

A typical example of the vinyl ester monomer is vinyl acetate, which is easily commercially available and ensures a higher impurity treatment efficiency in the production process. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, and aromatic vinyl esters such as vinyl benzoate. The aliphatic vinyl esters typically have 3 to 20 carbon atoms, preferably 4 to 10 carbon atoms, particularly preferably 4 to 7 carbon atoms. These vinyl esters may be used alone or, as required, a plurality of vinyl esters may be selected from these vinyl esters to be used in combination.

The molar content of the ethylene structural unit in the EVOH is typically 20 to 60 mol %, preferably 25 to 50 mol %, particularly preferably 25 to 35 mol % as measured in conformity with ISO14663. If the molar content of the ethylene structural unit is too low, the EVOH tends to be poorer in high-humidity gas barrier property and melt-formability/moldability for gas barrier applications. If the molar content of the ethylene structural unit is too high, the EVOH tends to be poorer in gas barrier property.

The saponification degree of the vinyl ester unit in the EVOH is typically 90 to 100 mol %, preferably 95 to 100 mol %, particularly preferably 99 to 100 mol %, as measured in conformity with JIS K6726 (with the use of a solution obtained by homogenously dissolving the EVOH in a water/methanol solvent). If the saponification degree is too low, the EVOH tends to be poorer in gas barrier property, thermal stability, humidity resistance and the like.

Further, the EVOH typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is too high, the EVOH tends to have unstable film formability. If the MFR is too low, the EVOH tends to have an excessively high viscosity, making the melt extrusion difficult.

The inventive EVOH may further contain a structural unit derived from any of the following exemplary comonomers in an amount (e.g., not greater than 10 mol %) that does not impair the effects of the present disclosure.

The exemplary comonomers include: olefins such as propylene, 1-butene and isobutene; hydroxyl-containing α-olefins such as 2-propen-1-ol, 3-buten-1-ol, 4-penten-1-ol, 5-hexen-1-ol, 3,4-dihydroxy-1-butene and 5-hexen-1,2-diol, and derivatives of these hydroxyl-containing α-olefins including esterification products of these hydroxyl-containing α-olefins such as 3,4-diacyloxy-1-butene (e.g., 3,4-diacetoxy-1-butene), and acylation products of these hydroxyl-containing α-olefins such as 2,3-diacetoxy-1-allyloxypropane, 2-acetoxy-1-allyloxy-3-hydroxypropane, 3-acetoxy-1-allyloxy-2-hydroxypropane, glycerin monovinyl ether and glycerin monoisopropenyl ether; unsaturated acids such as acrylic acid, methacrylic acid, crotonic acid, (anhydrous) phthalic acid, (anhydrous) maleic acid and (anhydrous) itaconic acid, and salts and C1 to C18 monoalkyl or dialkyl esters thereof; acrylamide compounds such as acrylamide, C1 to C18 N-akylacrylamides, N,N-dimethylacrylamide and 2-acrylamidopropanesulfonic acid, and salts thereof, acrylamidopropyldimethylamine, and acid salts and quaternary salts thereof; methacrylamide compounds such as methacrylamide, C1 to C18 N-alkyl methacrylamides, N,N-dimethylmethacrylamide and 2-methacrylamidopropanesulfonic acid, and salts thereof, methacrylamidopropyldimethylamine, and acid salts and quaternary salts thereof; N-vinylamides such as N-vinylpyrrolidone, N-vinylformamide and N-vinylacetamide; vinyl cyanides such as acrylonitrile and methacrylonitrile; vinyl ethers such as C1 to C18 alkyl vinyl ethers, hydroxyalkyl vinyl ethers and alkoxyalkyl vinyl ethers; halogenated vinyl compounds such as vinyl chloride, vinylidene chloride, vinyl fluoride, vinylidene fluoride and vinyl bromide; vinylsilanes such as trimethoxyvinylsilane; halogenated allyl compounds such as allyl acetate and allyl chloride; allyl alcohol compounds such as allyl alcohol and dimethoxyallyl alcohol; and trimethyl-(3-acrylamido-3-dimethylpropyl)- ammonium chloride and acrylamido-2-methylpropanesulfonic acid, which may be used alone or in combination.

A post-modified EVOH such as an urethanized, acetalized, cyanoethylated or oxyalkylenated EVOH may be used as the EVOH (intermediate product).

The EVOH prepared by copolymerization with any of the hydroxyl-containing α-olefins is preferred for excellent secondary formability. Particularly, an EVOH containing a primary hydroxyl group at its side chain is preferred, and an EVOH having a 1,2-diol structure at its side chain is particularly preferred.

The EVOH having the 1,2-diol structure at its side chain contains a 1,2-diol structural unit at its side chain. An EVOH containing a structural unit represented by the following structural formula (1) is optimum.

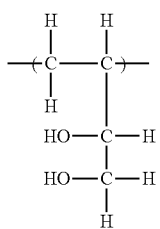

(1)

Where the EVOH contains the 1,2-diol structural unit, the content of the 1,2-diol structural unit is typically 0.1 to 20 mol %, preferably 0.5 to 15 mol %, particularly preferably 1 to 10 mol %.

In general, the lactone ring group and/or the carboxylic acid group are present at terminals of an ordinary EVOH. A major feature of the present disclosure is that the molar concentration ($Y/Z$) of the lactone ring molar content ($Y$) to the sum ($Z$) of the carboxylic acid molar content ($X$) and the lactone ring molar content ($Y$) at the terminals is not less than 58 mol %.

At the terminals of the EVOH, the lactone ring group is present in a greater amount than the carboxylic acid group. Thus, the EVOH is excellent in higher-temperature thermal stability, and is free from odor emanation and coloration even if being processed at a higher temperature.

In the present disclosure, the lactone ring molar concentration ($Y/Z$) is preferably not less than 58 mol %, more preferably 60 to 90 mol %, particularly preferably 62 to 80 mol %, especially preferably 62 to 70 mol %, further preferably 63 to 70 mol %, for high-temperature thermal stability. If the molar concentration ($Y/Z$) is too low, the EVOH tends to be poorer in thermal stability. If the molar concentration is too high, a layer formed from the EVOH tends to have poorer adhesion to an adhesive resin layer in a multilayer structure.

In the present disclosure, the sum ($Z$) of the carboxylic acid molar content ($X$) and the lactone ring molar content ($Y$) at the terminals of the EVOH is preferably 0.01 to 0.3 mol %, particularly preferably 0.03 to 0.28 mol %, more preferably 0.05 to 0.25 mol %, especially preferably 0.1 to 0.25 mol %, particularly preferably 0.2 to 0.25 mol %, based on the total amount of the monomer units of the EVOH for thermal stability. If the sum ($Z$) is too small, the EVOH tends to be poorer in adhesion. If the sum ($Z$) is too large, the EVOH tends to have lower heat resistance.

The monomer units herein include an ethylene unit represented by the following chemical formula (2), a vinyl alcohol unit represented by the following chemical formula (3), a vinyl acetate unit represented by the following chemical formula (4) and other copolymerized monomer units, and the total amount of the monomer units means the total molar amount of these monomer units.

(2)

(3)

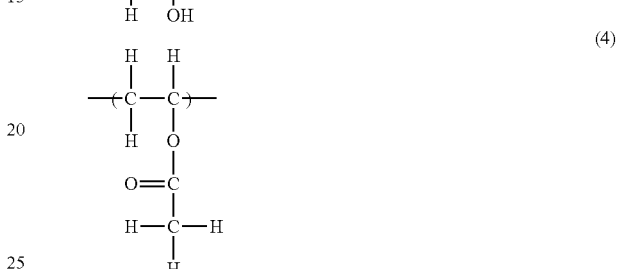

(4)

The carboxylic acid molar content ($X$) is preferably 0.01 to 0.3 mol %, particularly preferably 0.02 to 0.25 mol %, more preferably 0.03 to 0.2 mol %, especially preferably 0.05 to 0.10 mol %, with respect to the total amount of the monomer units of the EVOH for heat resistance. If the carboxylic acid molar content ($X$) is too low, the EVOH tends to be poorer in adhesion. If the carboxylic acid molar content ($X$) is too high, the EVOH tends to have lower heat resistance.

The lactone ring molar content ($Y$) is preferably 0.01 to 0.3 mol %, particularly preferably 0.05 to 0.25 mol %, more preferably 0.08 to 0.2 mol %, especially preferably 0.1 to 0.15 mol %, with respect to the total amount of the monomer units of the EVOH for heat resistance. If the lactone ring molar content ($Y$) is too low, the EVOH tends to be poorer in adhesion. If the lactone ring molar content ($Y$) is too high, the EVOH tends to have lower heat resistance.

The carboxylic acid molar content ($X$), the lactone ring molar content ($Y$) and the lactone ring molar concentration ($Y/Z$) are measured by NMR measurement.

The NMR measurement is performed in the following manner.

<Measurement Conditions>
Apparatus: Bruker's AVANCE III
Measurement frequency: 400 MHz
Solvent: Water/ethanol (having a weight ratio of 35:65 (water:ethanol) and DMSO (dimethyl sulfoxide)-D6
Polymer concentration: 5%
Measurement temperatures: 70° C. for water/ethanol, and 50° C. for DMSO-D6
Integration number: 16
Pulse recurrence time: 4 seconds
Sample rotation speed: 20 Hz
Additive: Trifluoroacetic acid
  <Analysis Method>
  (1-1) Measurement of Terminal Methyl Amount
  The terminal methyl amount is calculated based on $^1$H-NMR measurement (measurement with DMSO-D6 at 50° C.). More specifically, the terminal methyl amount is calculated from the following expression (Ex. 1) by using an integration value ($I_{Me-1}$) of a peak appearing between 0.7 and 0.95 ppm for terminal methyl, an integration value ($I_{CH2}$) of peaks appearing between 0.95 and 1.85 ppm for non-terminal methylene (a total integration value of peaks for methylene in the ethylene unit, the vinyl alcohol unit and the vinyl acetate unit), an integration value ($I_{OAc}$) of a peak appearing between 1.9 and 2 ppm for terminal methyl in the vinyl acetate unit and an integration value ($I_{CH}$) of peaks appearing between 3.1 and 4.3 ppm for methine in the vinyl alcohol unit as shown in a chart of FIG. 1.

Terminal methyl amount (mol %)=$(I_{Me-1}/3)/[(I_{Me-1}/3)+(I_{OAc}/3)+I_{CH}+\{I_{CH2}-2\times I_{CH}-2\times (I_{OAc}/3)-2\times (I_{Me-1}/3)\}/4]$ (Ex. 1)

(1-2) Measurement of Carboxylic Acid Molar Content (X) and Lactone Ring Molar Content (Y)

The contents of the carboxylic acid group and the lactone ring group at polymer terminals are calculated based on $^1$H-NMR measurement (measurement with a water/ethanol solvent at 70° C.) by using the terminal methyl amount (mol %) obtained in the item (1-1). More specifically, the carboxylic acid molar content (X) (mol %) and the lactone ring molar content (Y) (mol %) are calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm and an integration value (Iv) of a peak appearing between 2.5 and 2.7 ppm as shown in a chart of FIG. 2.

Carbon acid molar content (X) (mol %)=Terminal methyl amount (mol %)$\times (I_x/2)/(I_{Me-2}/3)$ (Ex. 2)

Lactone ring molar content (Y) (mol %)=Terminal methyl amount (mol %)$\times (I_Y/2)/(I_{Me-2}/3)$ (Ex. 3)

(1-3) Calculation of Lactone Ring Molar Concentration (Y/Z) with Respect to Sum (Z) of Carboxylic Acid Molar Content (X) and Lactone Ring Molar Content (Y) at Terminals The lactone ring molar concentration (Y/Z) is calculated from the following expression (Ex. 4) based on the carboxylic acid molar content (X) and the lactone ring molar content (Y) calculated above.

Lactone ring molar concentration (Y/Z) (mol %) with respect to sum (Z) of carboxylic acid molar content (X) and lactone ring molar content (Y)=$\{Y/(X+Y)\}\times 100(\%)$ (Ex. 4)

In the present disclosure, the EVOH in which the lactone ring molar concentration (Y/Z) with respect to the sum (Z) of the carboxylic acid molar content (X) and the lactone ring molar content (Y) at the terminals of the EVOH falls within the aforementioned range is produced, for example, by a production process including a saponifying step [I] of saponifying the ethylene-vinyl ester copolymer to provide an EVOH intermediate product, a chemical treatment step [II] of chemically treating the EVOH intermediate product with a chemical treatment liquid, and a drying step [III] of drying the chemically treated EVOH intermediate product, wherein a higher drying temperature is employed in the drying step [III] (method (1)), a longer drying period is employed in the drying step [III](method (2)), and/or the monovalent carboxylic acid concentration of the chemical treatment liquid is increased in the chemical treatment step [II] (method (3)) These methods (1) to (3) may be used alone or in combination.

Particularly, in the production process including the saponifying step [I] of saponifying the ethylene-vinyl ester copolymer to provide the EVOH intermediate product, the chemical treatment step [II] of chemically treating the EVOH intermediate product with the chemical treatment liquid, and the drying step [III] of drying the chemically treated EVOH intermediate product, the method (3) is preferably arranged so that the monovalent carboxylic acid concentration of the chemical treatment liquid is increased in the following manner in the chemical treatment step [II]. More specifically, it is preferred, for the high-temperature thermal stability of the EVOH, that a monovalent carboxylic acid and a carboxylic acid metal salt are used in combination as chemical treatment agents for the chemical treatment liquid and the monovalent carboxylic acid concentration of the chemical treatment liquid is increased, and that the weight-based ratio of the monovalent carboxylic acid concentration to the metal ion concentration of the carboxylic acid metal salt (monovalent carboxylic acid concentration/metal ion concentration) is not less than 13.

In the saponifying step [I], the ethylene-vinyl ester copolymer prepared by the copolymerization of the ethylene monomer and the vinyl ester monomer is saponified by an ordinally known method.

In the chemical treatment step [II], the EVOH intermediate product is chemically treated with the chemical treatment liquid containing the chemical treatment agents. This step is performed to impart the EVOH with thermal stability and adhesiveness. Various compounds are usable as the chemical treatment agents, and examples of the compounds include carboxylic acids and inorganic acids such as boric acid and phosphoric acid, and esters and metal salts of the carboxylic acids and the inorganic acids. These compounds are generally soluble in water. The chemical treatment liquid is an aqueous solution containing any of these compounds.

More specifically, the carboxylic acids to be used as the chemical treatment agent are monovalent carboxylic acids. Examples of the monovalent carboxylic acids include acetic acid, propionic acid, butyric acid and stearic acid. For thermal stability, C1 to C10 aliphatic monovalent carboxylic acids are preferred, and C1 to C4 aliphatic monovalent carboxylic acids are more preferred. Particularly, acetic acid is preferred.

Examples of the inorganic acids include boric acid, phosphoric acid, carbonic acid and sulfuric acid.

Examples of the metal salts of the carboxylic acids and the inorganic acids include alkali metal salts, alkali earth metal salts, and salts of d-block metals of the fourth period of the Periodic Table. Examples of the alkali metals include sodium and potassium. Examples of the alkali earth metals include calcium and magnesium. Examples of the d-block metals of the fourth period of the Periodic Table include titanium, manganese, copper, cobalt and zinc. The alkali metal salts are preferred, and the sodium salts and the potassium salts are particularly preferred.

Examples of the carboxylic acid metal salts include: alkali metal salts of carboxylic acids including alkali metal acetates such as sodium acetate and potassium acetate, alkali metal propionates such as sodium propionate and potassium propionate, and alkali metal stearates such as sodium stearate and potassium stearate; and alkali earth metal salts of carboxylic acids including alkali earth metal acetates such as magnesium acetate and calcium acetate, alkali earth metal propionates such as magnesium propionate and calcium propionate, and alkali earth metal stearates such as magnesium stearate and calcium stearate. Examples of the inorganic acid metal salts include: alkali metal salts of inorganic acids including alkali metal borates such as sodium borate and potassium borate, and alkali metal phosphates such as sodium phosphate and potassium phosphate; and alkali earth metal salts of inorganic acids including alkali earth metal borates such as magnesium borate and calcium borate, and alkali earth metal phosphates such as magnesium phosphate and calcium phosphate. The phosphates may include hydrogenphosphates. These metal salts may be used alone or in combination. The metal salts of the carboxylic acids are preferred for the thermal stability of the resulting EVOH resin. Further, the metal salts of the C1 to C10 aliphatic monovalent carboxylic acids are more preferred, and the metal salts of the C1 to C4 aliphatic monovalent carboxylic acids are further preferred. Particularly, the metal acetates are preferred.

For the thermal stability, the chemical treatment liquid preferably contains a monovalent carboxylic acid and a metal salt of a carboxylic acid, more preferably a monovalent carboxylic acid and a metal salt of a monovalent carboxylic acid, particularly preferably a monovalent carboxylic acid, a metal salt of a monovalent carboxylic acid, an inorganic acid and a metal salt of an inorganic acid, as the chemical treatment agents. More specifically, the chemical treatment liquid preferably contains acetic acid, a metal acetate, boric acid and a phosphate.

A solution of the EVOH intermediate product preferably has a water content of 20 to 80 wt. % so as to be quickly and homogenously mixed with the compounds to be used as the chemical treatment agents. When the EVOH intermediate product is treated in contact with the chemical treatment liquid, the concentrations of the compounds in the aqueous solution, a contact treatment period, a contact treatment temperature, a stirring speed in the contact treatment and the water content of the EVOH intermediate product to be treated may be controlled to control the contents of the respective compounds.

In the chemical treatment process [II], the weight-based ratio of the monovalent carboxylic acid concentration to the metal ion concentration of the carboxylic acid metal salt (monovalent carboxylic acid concentration/metal ion concentration) in the chemical treatment liquid is preferably not less than 13, particularly preferably not less than 20, more preferably not less than 22, further preferably not less than 25, especially preferably not less than 30, for the high-temperature thermal stability. If the ratio is too low, the EVOH tends to be poorer in thermal stability. The upper limit of the ratio is typically 100, preferably 50.

The chemical treatment step [II] of chemically treating the EVOH intermediate product with the chemical treatment liquid may be a single-stage chemical treatment step in which a chemical treatment liquid containing the carboxylic acid in a higher concentration is used, or may be a multi-stage chemical treatment step in which a plurality of chemical treatment liquids containing the carboxylic acid in different concentrations are used. The expression "the weight-based ratio of the monovalent carboxylic acid concentration to the metal ion concentration of the carboxylic acid metal salt (monovalent carboxylic acid concentration/metal ion concentration) in the chemical treatment liquid is not less than 13 in the chemical treatment step [II]" means that the weight-based ratio of the carboxylic acid concentration to the metal ion concentration of the carboxylic acid metal salt (monovalent carboxylic acid concentration/metal ion concentration) is not less than 13 in the chemical treatment liquid containing the carboxylic acid in the higher concentration for use in the single-stage chemical treatment step. The above expression also means that the weight-based ratio of the monovalent carboxylic acid concentration to the metal ion concentration of the carboxylic acid metal salt (monovalent carboxylic acid concentration/metal ion concentration) is not less than 13 in a chemical treatment liquid containing the monovalent carboxylic acid in the highest concentration among the plurality of chemical treatment liquids for use in the multi-stage chemical treatment step as will be described later.

For efficient production of the EVOH excellent in thermal stability, the multi-stage chemical treatment step is preferred in which the plural chemical treatment liquids having different monovalent carboxylic acid concentrations are used for the respective chemical treatments. The multi-stage chemical treatment step for the chemical treatment step [II] of chemically treating the EVOH intermediate product with the chemical treatment liquid is performed in the following manner. First, the plurality of chemical treatment liquids having different monovalent carhoxylic acid concentrations are prepared. Then, the EVOH intermediate product is chemically treated on multiple stages by using the plurality of chemical treatment liquids for the respective chemical treatments (in the multi-stage chemical treatment step). In this case, the weight-based ratio of the monovalent carboxylic acid concentration to the metal ion concentration of the carboxylic acid metal salt (monovalent carboxylic acid concentration/metal ion concentration) is preferably not less than 13 in the chemical treatment liquid having the highest monovalent carboxylic acid concentration among the plurality of chemical treatment liquids.

In the present disclosure, the monovalent carboxylic acid concentration of the chemical treatment liquid is preferably 1 to 50000 ppm, particularly preferably 10 to 10000 ppm, especially preferably 400 to 5000 ppm. The metal ion concentration of the monovalent carboxylic acid metal salt is preferably 1 to 50000 ppm, particularly preferably 10 to 10000 ppm, for treatment efficiency and costs.

In the present disclosure, the term "monovalent carboxylic acid concentration" means the concentration of the monovalent carboxylic acid contained as the chemical treatment agent in the chemical treatment liquid. Where acetic acid is contained as the monovalent carboxylic acid, for example, the monovalent carboxylic acid concentration means the concentration of acetic acid in the chemical treatment liquid. Further, the term "the metal ion concentration of the carboxylic acid metal salt" means the concentration of metal ions of the carboxylic acid metal salt contained as the chemical treatment agent in the chemical treatment liquid. Where sodium acetate is contained in the chemical treatment liquid, for example, the metal ion concentration of the carboxylic acid metal salt means the concentration of sodium ions. Acetic acid ions contained in sodium acetate are not counted in the monovalent carboxylic acid concentration.

In the chemical treatment step [II], the treatment temperature is typically 10° C. to 100° C., preferably 15° C. to 80° C., more preferably 20° C. to 60° C. If the treatment temperature is too low, it will be difficult to introduce a predetermined amount of an acid or an acid salt into the EVOH intermediate product. If the treatment temperature is too high, it will be difficult to handle the solution, resulting in disadvantageous production.

In the chemical treatment step [II], the treatment period is typically not shorter than 1 hour, preferably 1.5 to 48 hours, more preferably 2 to 24 hours. If the treatment period is too short, EVOH pellets (intermediate product) tend to suffer from uneven color and/or poorer thermal stability. If the treatment period is too long, the EVOH pellets (intermediate product) tend to be colored.

It is generally preferred, for processability, to perform a pelletization process after the saponification step [I] to provide EVOH pellets (intermediate product), which are in turn chemically treated in the chemical treatment step [II].

In the drying step [III], the chemically treated EVOH intermediate product is dried. In the drying step, the drying temperature is preferably 80° C. to 150° C., more preferably 90° C. to 140° C., particularly preferably 100° C. to 130° C. If the drying temperature is too low, the drying period tends to be prolonged. If the drying temperature is too high, the EVOH intermediate product tends to be colored. The drying period is preferably not shorter than 3 hours, more preferably not shorter than 5 hours, particularly preferably not shorter than 8 hours. If the drying period is too short, the EVOH intermediate product tends to be insufficiently dried. The upper limit of the drying period is typically 1000 hours.

Various drying processes are usable for the drying. Exemplary drying processes include a fluidized drying process in which the chemically-treated substantially-pelletized EVOH intermediate product is agitated and spread mechanically or by hot air, and a stationary drying process in which the chemically-treated substantially-pelletized EVOH intermediate product is dried without dynamic motions such as the agitation and the spreading. Exemplary dryers for the fluidized drying process include a drum/groove type agitation dryer, a round pipe dryer, a rotary dryer, a fluid bed dryer, a vibrating fluid bed dryer and a conical rotor type dryer. Exemplary dryers for the stationary drying process include non-material-moving type dryers such as a batch box type dryer, and material-moving type dryers such as a band dryer, a tunnel dryer and a vertical dryer. The fluidized drying process and the stationary drying process may be used in combination for the drying. In the present disclosure, it is preferred to perform the fluidized drying process and then the stationary drying process for suppression of fusion sticking of the chemically treated EVOH pellets (intermediate product).

The drying process will be described.

In the fluidized drying process, air or an inert gas (e.g., nitrogen gas, helium gas, argon gas or the like) is used as a heating gas. The temperature of the heating gas is properly selected from a range of 40° C. to 150° C. according to the volatile content of the chemically treated EVOH intermediate product. In consideration of the fact that the chemically treated EVOH pellets (intermediate product) are liable to suffer from the fusion sticking at a higher temperature, the temperature of the heating gas is preferably 40° C. to 100° C., more preferably 40° C. to 90° C. Further, the flow speed of the heating gas in the dryer is preferably 0.7 to 10 m/second, more preferably 0.7 to 5 m/second, particularly 1 to 3 m/second. If the flow speed is too low, the chemically treated EVOH pellets (intermediate product) are liable to suffer from the fusion sticking. If the flow speed is too high, on the other hand, the chemically treated EVOH pellets (intermediate product) are liable to be chipped or broken into particles. The period for the fluidized drying process depends on the amount of the chemically treated EVOH pellets (intermediate product) to be dried, but is typically 5 minutes to 36 hours, preferably 10 minutes to 24 hours. After the chemically treated EVOH pellets (intermediate product) are subjected to the fluidized drying process under the aforementioned conditions, the EVOH preferably has a volatile content of 5 to 60 wt. %, more preferably 10 to 55 wt. %. If the volatile content is too high, the chemically treated EVOH pellets (intermediate product) are liable to suffer from the fusion sticking in the subsequent stationary drying process. An excessively low volatile content is not industrially preferred because of a greater energy loss. In the fluidized drying process, the volatile content is preferably reduced by not less than 5 wt. %, more preferably 10 to 45 wt. %, as compared with the volatile content before the process. If the reduction in the volatile content is too small, the EVOH is liable to suffer from minute fish eyes when being melt-formed or molded.

After the chemically treated EOVH intermediate product (pellets) is dried under the aforementioned conditions, the EVOH preferably has a water content of 0.001 to 5 wt. %, particularly preferably 0.01 to 2 wt. %, more preferably 0.1 to 1 wt. %. If the water content is too low, the EVOH tends to be poorer in long-run formability. If the water content is too high, the EVOH tends to suffer from foaming in extrusion.

The inventive EVOH typically has a melt flow rate (MFR) of 0.1 to 100 g/10 minutes, particularly preferably 0.5 to 50 g/10 minutes, more preferably 1 to 30 g/10 minutes (as measured at 210° C. with a load of 2160 g). If the melt flow rate is too low, it will be difficult to extrude the EVOH with a higher torque in an extruder during the extrusion. If the melt flow rate is too high, a product produced from the EVOH through a heat-stretching process tends to be poorer in appearance and gas barrier property.

The MFR of the EVOH may be controlled by controlling the polymerization degree of the EVOH or by adding a crosslinking agent or a plasticizer to the EVOH.

In the present disclosure, additives may be added to the EVOH, as long as the object of the present disclosure is not impaired. Examples of the additives include: lubricants such as saturated aliphatic amides (e.g., stearamide and the like), unsaturated fatty acid amides (e.g., oleamide and the like), bis-fatty acid amides (e.g., ethylene bis(stearamide) and the like), metal salts of fatty acids (e.g., calcium stearate, magnesium stearate and the like) and low molecular weight polyolefins (e.g., low molecular weight polyethylenes and low molecular weight polypropylenes having a molecular weight of about 500 to about 10,000, and the like); inorganic salts (e.g., hydrotalcites and the like); plasticizers (e.g., aliphatic polyvalent alcohols such as ethylene glycol, glycerin and hexanediol); oxygen absorbers including inorganic oxygen absorbers such as reduced iron powder, reduced iron powder containing a water-absorbing substance, an electrolyte or the like, aluminum powder, potassium sulfite and photo-catalytic titanium oxide, organic compound oxygen absorbers such as ascorbic acid, esters and metal salts of ascorbic acid, polyvalent phenol compounds (e.g., hydroquinone, gallic acid, hydroxyl-containing phenol aldehyde resins and the like), coordination compounds formed by coordination-bonding between a nitrogen-containing compound and a transition metal (e.g., bis-salicylaldehyde-imine cobalt, tetraethylenepentamine cobalt, cobalt-Schiff base complexes, porphyrins, macrocyclic polyamine complexes, polyethyleneimine-cobalt complexes and the like), terpene compounds, reaction products obtained by reaction between an amino acid and a hydroxyl-containing reductive substance and triphenylmethyl compounds, and polymer oxygen absorbers such as coordination compounds formed by coordination-bonding between a nitrogen-containing resin and a transition metal (e.g., a combination of MXD nylon and cobalt), blends of a tertiary hydrogen-containing resin and a transition metal (e.g., a combination of polypropylene and cobalt), blends of an unsaturated carbon-carbon bond-containing resin and a transition metal (e.g., a combination of polybutadiene and cobalt), photo-oxidation degradative resins (e.g., polyketones), anthraquinonepolymers (e.g., polyvinylanthraquinone), and mixtures containing any of these blends and a photo initiator (benzophenone or the like), a peroxide scavenger (a commercially available antioxidant or the like) and/or a deodorant (active carbon or the like); and thermal stabilizers, photo stabilizers, UV absorbers, colorants, antistatic agents, surfactants, antibacterial agents, anti-blocking agents, slipping agents, fillers (e.g., inorganic fillers and the like), and other resins (e.g., polyolefins, polyamides and the like). These compounds may be used alone or in combination.

The inventive EVOH or an inventive EVOH resin composition containing the inventive EVOH can be used for formation of various products. Exemplary products include a single-layer film containing the inventive EVOH or the inventive EVOH resin composition, and a multilayer structure including at least one layer containing the inventive EVOH or the inventive EVOH resin composition.

The multilayer structure will hereinafter be described.

For production of the inventive multilayer structure, the layer containing the inventive EVOH or the inventive EVOH resin composition is laminated with other base material (thermoplastic resin or the like) on one or both sides thereof. Exemplary laminating methods include a laminating method in which the other base material is melt-extruded onto a film or a sheet containing the inventive EVOH or the inventive EVOH resin composition, a laminating method in which the inventive EVOH or the inventive EVOH resin composition is melt-extruded onto the base material, a method in which the inventive EVOH or the inventive EVOH resin composition and the other base material are coextruded, and a method in which (a layer of) the inventive EVOH or the inventive EVOH resin composition and (a layer of) the other base material are dry-laminated together with the use of a known adhesive agent such as of an organic titanium compound, an isocyanate compound, a polyester compound or a polyurethane compound. The temperature for the melt extrusion is generally selected from a range of 150° C. to 300° C.

A thermoplastic resin is useful as the other base material. Specific examples of the thermoplastic resin include: olefin homopolymers and copolymers including polyethylenes such as linear low-density polyethylenes, low-density polyethylenes, very-low-density polyethylenes, medium-density polyethylenes and high-density polyethylenes, ethylene-vinyl acetate copolymers, ionomers, ethylene-propylene (block or random) copolymers, ethylene-acrylic acid copolymers, ethylene-acrylate copolymers, polypropylenes, propylene-α-olefin (C4 to C20 α-olefin) copolymers, polybutenes and polypentenes, and polyolefin resins in a broader sense such as products obtained by graft-modifying any of these olefin homopolymers and copolymers with an unsaturated carboxylic acid or a carboxylate; and polyester resins, polyamide resins (including polyamide copolymers), polyvinyl chlorides, polyvinylidene chlorides, acryl resins, polystyrenes, vinyl ester resins, polyester elastomers, polyurethane elastomers, chlorinated polyethylenes, chlorinated polypropylenes, aromatic and aliphatic polyketones, polyalcohols obtained by reduction of these polymers, and EVOHs other than the inventive EVOH. From the viewpoint of the practicality and the physical properties (particularly, the strength) of the multilayer structure, the polypropylenes, the ethylene-propylene (block or random) copolymers, the polyamide resins, the polyethylenes, the ethylene-vinyl acetate copolymers, the polystyrenes, polyethylene terephthalates (PET) and polyethylene naphthalates (PEN) are preferably used.

Where a formed product such as a film or a sheet containing the inventive EVOH or the inventive EVOH resin composition is extrusion-coated with the other base material, or where a formed product such as a film or a sheet containing the inventive EVOH or the inventive EVOH resin composition and a film, a sheet or the like of the other base material are laminated together with the use of the adhesive agent, usable examples of the base material other than the thermoplastic resins described above include paper, a metal foil, a uniaxially or biaxially stretched plastic film or sheet, a film or a sheet on which an inorganic compound is vapor-deposited, a woven fabric, a nonwoven fabric, a metal fiber material and a wood material.

Where layers a (a1, a2, . . . ) of the inventive EVOH or the inventive EVOH resin composition and layers b (b1, b2, . . . ) of the other base material (e.g., the thermoplastic resin) are stacked to form a laminate having an innermost layer a, for example, the layered structure of the laminate is not limited to a double layer structure a/b (inner layer/outer layer, this definition applies to the following description), but may be any combination of these layers, e.g., a/b/a, a1/a2/b, a/b1/b2, a1/b1/a2/b2, a1/b1/b2/a2/b2/b1 or the like. Where the laminate further includes a regrind layer R formed of a mixture containing at least the EVOH and the thermoplastic resin, for example, the layered structure of the laminate may be a/R/b, a/R/a/b, a/b/R/a/R/b, a/b/a/R/a/b, a/b/R/a/R/a/R/b, or the like.

As required, an adhesive resin layer may be provided between the layers of the aforementioned layered structure. Various adhesive resins are usable for the adhesive resin layer. The adhesive resin to be used for providing a highly stretchable multilayer structure cannot be unconditionally specified, but depends on the type of the resin for the layer b. Examples of the adhesive resin include olefin polymers modified as containing a carboxyl group by chemically bonding an unsaturated carboxylic acid or its anhydride to the olefin polymers (the aforementioned polyolefin resins in a broader sense) by an addition reaction or a graft reaction.

Specific preferred examples of the adhesive resin include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride and ethylene-vinyl acetate copolymers graft-modified with maleic anhydride, which may be used alone or in combination as a mixture. In this case, the proportion of the unsaturated carboxylic acid or its anhydride to be contained in the thermoplastic resin is preferably 0.001 to 3 wt. %, more preferably 0.01 to 1 wt. %, particularly preferably 0.03 to 0.5 wt. %. If the modification degree of such a modification product is too low, the adhesiveness tends to be poorer. If the modification degree is too high, on the other hand, a crosslinking reaction tends to occur, thereby reducing the formability.

Further, the adhesive resin may be blended with the inventive EVOH or the inventive EVOH resin composition, the other EVOH, a rubber or an elastomer such as a polyisobutylene or an ethylene propylene rubber, or the resin for the layer b. Particularly, the adhesiveness can be advantageously improved by blending a polyolefin resin different from the base polyolefin resin for the adhesive resin.

The thicknesses of the respective layers of the multilayer structure cannot be unconditionally specified, but depend on the layered structure, the type of the layer b, the use purpose, the container shape and the required physical properties. The thickness of the layer a is typically selected from a range of 5 to 500 μm, preferably 10 to 200 μm, and the thickness of the layer b is typically selected from a range of 10 to 5000 μm, preferably 30 to 1000 μm. The thickness of the adhesive resin layer is typically selected from a range of 5 to 400 μm, preferably 10 to 150 μm.

The multilayer structure is used as it is in various forms. It is preferred to perform a heat stretching process on the multilayer structure for improvement of the physical properties of the multilayer structure. The heat stretching process herein means that a thermally uniformly heated laminate in the form of a film, a sheet or a parison is uniformly formed into a cup, a tray, a tube or a film with the use of a chuck, a plug, a vacuum force, a compressed air force, a blow or the like. The stretching process may be a uniaxial stretching process or a biaxial stretching process. The stretching ratio of the laminate is preferably as high as possible for physical properties. This makes it possible to produce stretched formed products free from pinholes, cracking, uneven stretching, uneven thickness, delamination and the like which may otherwise occur during the stretching.

A roll stretching method, a tenter stretching method, a tubular stretching method, a stretch-blowing method or a vacuum pressure forming method having a higher stretching ratio may be employed for the stretching process. A simultaneous biaxial stretching method or a sequential biaxial stretching method may be employed for the biaxial stretching process. The stretching temperature is selected from a range of 60° C. to 170° C., preferably about 80° C. to about 160° C. It is also preferred to perform a heat-setting process after the completion of the stretching process. The heat-setting process may be performed by known means. The stretched film is typically heat-treated at 80° C. to 170° C., preferably 100° C. to 160° C., for about 2 to about 600 seconds while being kept in tension.

Where the laminate is used for heat-shrink packaging applications for raw meat, processed meat, cheese or the like, the laminate not subjected to the heat-setting process after the stretching is used as a product film, and the raw meat, the processed meat, the cheese or the like is wrapped with the film, which is in turn heat-treated typically at 50° C. to 130° C., preferably 70° C. to 120° C., for about 2 to about 300 seconds to be thereby heat-shrunk for tight packaging.

The multilayer structure thus produced may be used in a desired form. Exemplary forms include a film, a sheet, a tape and a profile extrusion product. As required, the multilayer structure may be subjected to a heat treatment, a cooling process, a rolling process, a printing process, a dry laminating process, a solution or melt coating process, a bag making process, a deep drawing process, a box making process, a tube making process, a splitting process or the like.

Containers such as cups, trays and tubes produced in the aforementioned manner, and bags and caps formed of the stretched film are useful as various packaging materials for foods, beverages, medicines, cosmetics, industrial chemicals, detergents, agricultural chemicals, fuels and the like.

EXAMPLES

The present disclosure will hereinafter be described more specifically by way of examples thereof. It should be understood that the present disclosure be not limited to the inventive examples within the scope of the present disclosure.

In the examples, "%" is based on weight.
The physical properties were determined in the following manner.

(1) Quantitative Analysis of Primary Structure of EVOH (NMR Method)
<Measurement Conditions>
Apparatus: Bruker's AVANCE III
Measurement frequency: 400 MHz
Solvent: Water/ethanol (having a weight ratio of 35:65 (water:ethanol) and DMSO-D6)
Polymer concentration: 5%
Measurement temperatures: 70° C. for water/ethanol and 50° C. for DMSO-D6
Integration number: 16
Pulse recurrence time: 4 seconds
Sample rotation speed: 20 Hz
Additive: Trifluoroacetic acid
<Analysis Method>
(1-1) Measurement of Terminal Methyl Amount The terminal methyl amount was calculated based on $^1$H-NMR measurement (measurement with DMSO-D6 at 50° C.) (with a chemical shift determined with respect to a peak appearing at 2.50 ppm for DMSO). The terminal methyl amount was calculated from the following expression (Ex. 1) by using an integration value ($I_{Me-1}$) for terminal methyl between 0.7 and 0.95 ppm, an integration value ($I_{CH2}$) for non-terminal methylene between 0.95 and 1.85 ppm (a total integration value for methylene in the ethylene unit, the vinyl alcohol unit and the vinyl acetate unit), an integration value ($I_{OAc}$) for terminal methyl in the vinyl acetate unit between 1.9 and 2 ppm and an integration value ($I_{CH}$) for methine in the vinyl alcohol unit between 3.1 and 4.3 ppm as shown in a chart of FIG. 1. Here, the integration values ($I_{Me-1}$), ($I_{CH2}$), ($I_{OAc}$) and ($I_{CH}$) were integration values of peaks attributable to the terminal methyl, the non-terminal methylene, the terminal methyl in the vinyl acetate unit, and the methine in the vinyl alcohol unit, respectively.

$$\text{Terminal methyl amount (mol \%)} = (I_{Me-1}/3)/[(I_{Me-1}/3) + (I_{OAc}/3) + I_{CH} + \{I_{CH2} - 2 \times I_{CH} - 2 \times (I_{OAc}/3) - 2 \times (I_{Me-1}/3)\}/4] \quad \text{(Ex. 1)}$$

(1-2) Measurement of Carboxylic Acid Molar Content (X) and Lactone Ring Molar Content (Y)

The molar contents of the carboxylic acid group and the lactone ring group at polymer terminals were calculated based on H-NMR measurement (measurement with a water/ethanol solvent at 70° C.) (with a chemical shift determined with respect to a peak appearing at 0 ppm for TMS) by using the terminal methyl amount (mol %) obtained in the item (1-1).

Figure 2:
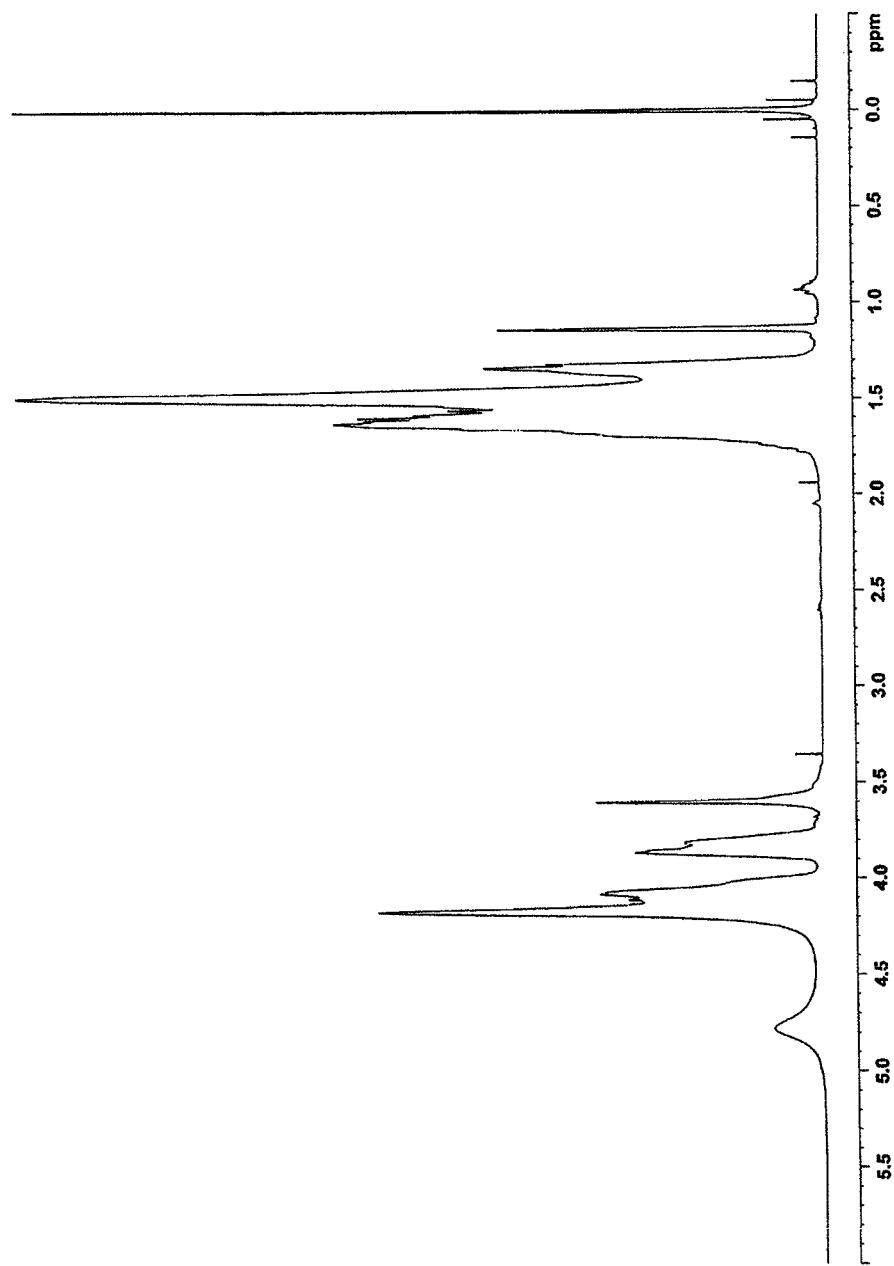
FIG. 2 is a typical $^1$H-NMR chart of the EVOH in a water/ethanol solvent.

More specifically, the carboxylic acid molar content (X) (mol %) and the lactone ring molar content (Y) (mol %) were calculated from the following expressions (Ex. 2) and (Ex. 3), respectively, by using an integration value ($I_{Me-2}$) of a peak appearing between 0.7 and 1 ppm for terminal methyl, an integration value ($I_x$) of a peak appearing between 2.15 and 2.32 ppm and an integration value ($I_y$) of a peak appearing between 2.5 and 2.7 ppm as shown in a chart of FIG. 2. Here, the integration values ($I_{Me-2}$), ($I_x$) and ($I_y$) were integration values of peaks attributable to the terminal methyl, the carboxylic acid group and the terminal lactone ring group, respectively.

$$\text{Carbon acid molar content } (X) \text{ (mol \%)} = \text{Terminal methyl amount (mol \%)} \times (I_x/2)/(I_{Me-2}/3) \quad \text{(Ex. 2)}$$

$$\text{Lactone ring molar content } (Y) \text{ (mol \%)} = \text{Terminal methyl amount (mol \%)} \times (I_y/2)/(I_{Me-2}/3) \quad \text{(Ex. 3)}$$

(1-3) Calculation of Lactone Ring Molar Concentration (Y/Z) with Respect to Sum (Z) of Carboxylic Acid Molar Content (X) and Lactone Ring Molar Content (Y) at Terminals The lactone ring molar concentration (Y/Z) was calculated from the following expression (Ex. 4) based on the carboxylic acid molar content (X) and the lactone ring molar content (Y) calculated above.

If the calculations are impossible due to the presence of additives, impurities and the like other than the EVOH, a sample cleaning process or the like may be performed. The sample cleaning process is performed, for example, by the following method. More specifically, a sample is freeze-crushed, and the crushed sample is immersed in water to be ultrasonically cleaned. Then, the resulting sample is filtered, and the filtration residue is dried. The NMR measurement is performed on the dried filtration residue.

Lactone ring molar concentration (Y/Z) (mol %) with respect to sum (Z) of carboxylic acid molar content (X) and lactone ring molar content (Y)={Y/(X+Y)}×100(%)   (Ex. 4)

(Thermal Stability)

The EVOH was evaluated for thermal stability based on a temperature at which the weight of the EVOH was reduced to 95% of the initial weight as measured by means of a thermogravimetric apparatus (Pyris 1 TGA available from Perkin Elmer Corporation) by using about 5 mg of EVOH pellets. With the use of the TGA, the measurement was performed in a nitrogen atmosphere with a nitrogen flow rate of 20 mL/minute, a temperature increase rate of 10° C./minute and a temperature range of 30° C. to 550° C.

Reference Example 1

An EVOH (A) (intermediate product) having an ethylene molar content of 32 mol % and a saponification degree of 99.5 mol % was deposited from a water/methanol solution thereof, and the resulting porous deposit (containing 100 parts of water based on 100 parts of the EVOH (intermediate product)) was put in an aqueous solution containing 350 ppm of acetic acid, 370 ppm of sodium acetate, 15 ppm of calcium dihydrogenphosphate and 57 ppm of boric acid. Then, the resulting mixture was stirred at 30° C. to 35° C. for 1 hour, and this stirring operation was performed five times by changing the aqueous solution (first chemical treatment step). In the aqueous solution used in the first chemical treatment step, the weight-based ratio of the monovalent carboxylic acid concentration to the metal ion concentration of the carboxylic acid metal salt (monovalent carboxylic acid concentration/metal ion concentration) was 3.0. Subsequently, the resulting porous deposit of the EVOH (intermediate product) was put in an aqueous solution containing 700 ppm of acetic acid, 370 ppm of sodium acetate, 15 ppm of calcium dihydrogenphosphate and 57 ppm of boric acid. Then, the resulting mixture was stirred at 30° C. to 35° C. for 4 hours, whereby the amount of acetic acid in the porous deposit of the EVOH intermediate product was adjusted (second chemical treatment step). In the aqueous solution used in the second chemical treatment step, the weight-based ratio of the monovalent carboxylic acid concentration to the metal ion concentration of the carboxylic acid metal salt (monovalent carboxylic acid concentration/metal ion concentration) was 6.7. The resulting porous deposit of the EVOH intermediate product was dried at 121° C. for 10 hours. Thus, the EVOH composition (EVOH pellets) was produced.

The results of the measurements performed on the EVOH composition (EVOH pellets) thus produced are shown in Table 1.

Example 1

An inventive EVOH composition (EVOH pellets) was produced in substantially the same manner as in Reference Example 1, except that the acetic acid amount of the aqueous solution was 1400 ppm in the adjustment of the acetic acid amount and the weight-based ratio of the monovalent carboxylic acid concentration to the metal ion concentration of the carboxylic acid metal salt (monovalent carboxylic acid concentration/metal ion concentration) was 13.5 in the aqueous solution used in the second chemical treatment step.

The results of the measurements performed on the EVOH composition (EVOH pellets) thus produced are shown in Table 1.

Example 2

An inventive EVOH composition (EVOH pellets) was produced in substantially the same manner as in Reference Example 1, except that the acetic acid amount of the aqueous solution was 2450 ppm in the adjustment of the acetic acid amount, and the weight-based ratio of the monovalent carboxylic acid concentration to the metal ion concentration of the carboxylic acid metal salt (monovalent carboxylic acid concentration/metal ion concentration) was 23.6 in the aqueous solution used in the second chemical treatment step.

The results of the measurements performed on the EVOH composition (EVOH pellets) thus produced are shown in Table 1.

Example 3

An inventive EVOH composition (EVOH pellets) was produced in substantially the same manner as in Reference Example 1, except that the acetic acid amount of the aqueous solution was 2450 ppm in the adjustment of the acetic acid amount, and the weight-based ratio of the monovalent carboxylic acid concentration to the metal ion concentration of the carboxylic acid metal salt (monovalent carboxylic acid concentration/metal ion concentration) was 23.6 in the aqueous solution used in the second chemical treatment step, and the drying temperature was 150° C.

The results of the measurements performed on the EVOH composition (EVOH pellets) thus produced are shown in Table 1.

Example 4

An inventive EVOH composition (EVOH pellets) was produced in substantially the same manner as in Reference Example 1, except that the acetic acid amount of the aqueous solution was 3500 ppm in the adjustment of the acetic acid amount, and the weight-based ratio of the monovalent carboxylic acid concentration to the metal ion concentration of the carboxylic acid metal salt (monovalent carboxylic acid concentration/metal ion concentration) was 33.7 in the aqueous solution used in the second chemical treatment step.

The results of the measurements performed on the EVOH composition (EVOH pellets) thus produced are shown in Table 1.

Example 5

An inventive EVOH composition (EVOH pellets) was produced in substantially the same manner as in Reference Example 1, except that the acetic acid amount of the aqueous solution was 3500 ppm in the adjustment of the acetic acid amount, and the weight-based ratio of the monovalent carboxylic acid concentration to the metal ion concentration of the carboxylic acid metal salt (monovalent carboxylic acid concentration/metal ion concentration) was 33.7 in the aqueous solution used in the second chemical treatment step, and the drying temperature was 150° C.

The results of the measurements performed on the EVOH composition (EVOH pellets) thus produced are shown in Table 1.

Comparative Example 1

An EVOH composition (EVOH pellets) was produced in substantially the same manner as in Reference Example 1, except that the acetic acid amount of the aqueous solution was 350 ppm in the adjustment of the acetic acid amount, and the weight-based ratio of the monovalent carboxylic acid concentration to the metal ion concentration of the carboxylic acid metal salt (monovalent carboxylic acid concentration/metal ion concentration) was 3.4 in the aqueous solution used in the second chemical treatment step, and the drying temperature was 118° C.

The results of the measurements performed on the EVOH composition (EVOH pellets) thus produced are shown in Table 1.

The inventive EVOH, in which the lactone ring molar concentration with respect to the sum of the carboxylic acid molar content and the lactone ring molar content falls within the specific range, is excellent in thermal stability and thermal decomposition suppressing effect at a higher temperature, and is free from odor emanation and coloration even if being processed at the higher temperature. Therefore, containers such as cups, trays and tubes, and stretched films for bags and caps can be formed from the inventive EVOH. Thus, the inventive EVOH can be advantageously used as various packaging materials for foods, beverages, medicines, cosmetics, industrial chemicals, detergents, agricultural chemicals, fuels and the like.

The invention claimed is:

1. A method of producing an ethylene-vinyl alcohol copolymer comprising
    an ethylene unit and a vinyl alcohol unit as monomer units, and
    a carboxylic acid group and a lactone ring group present at terminals thereof,

TABLE 1

|  | Reference Example 1 | Example 1 | Example 2 | Example 3 | Example 4 | Example 5 | Comparative Example 1 |
|---|---|---|---|---|---|---|---|
| Carboxylic acid molar content (X) (mol %) | 0.09 | 0.08 | 0.08 | 0.08 | 0.08 | 0.09 | 0.11 |
| Lactone ring molar content (Y) (mol %) | 0.12 | 0.13 | 0.13 | 0.13 | 0.14 | 0.14 | 0.12 |
| Sum (Z) (mol %) of carboxylic acid molar content (X) and lactone ring molar content (Y) | 0.21 | 0.21 | 0.21 | 0.21 | 0.22 | 0.23 | 0.23 |
| Molar concentration (Y/Z) (mol %) | 57 | 62 | 62 | 62 | 64 | 61 | 52 |
| Conditions for production of EVOH composition | | | | | | | |
| Acetic acid amount (ppm) of aqueous solution | 700 | 1400 | 2450 | 2450 | 3500 | 3500 | 350 |
| Weight-based ratio of monovalent carboxylic acid concentration to metal ion concentration in aqueous solution used in second chemical treatment step | 6.7 | 13.5 | 23.6 | 23.6 | 33.7 | 33.7 | 3.4 |
| Drying temperature (° C.) | 121 | 121 | 121 | 150 | 121 | 150 | 118 |
| Drying period (hour) | 10 | 10 | 10 | 10 | 10 | 10 | 10 |
| Thermal stability (° C.) | 361 | 363 | 363 | 362 | 363 | 363 | 343 |

The above results indicate that the EVOH pellets of Examples in which the lactone ring molar concentration (Y/Z) with respect to the sum (Z) of the carboxylic acid molar content (X) and the lactone ring molar content (Y) at the terminals of the EVOH satisfies the specified requirement are excellent in high-temperature thermal stability. In contrast, the EVOH pellets of Reference Example 1 and Comparative Example 1 in which the lactone ring molar concentration (Y/Z) fails to satisfy the specified requirement are poorer in thermal stability. In Examples 1 to 5, the temperatures detected in the thermal stability evaluation are 362° C. to 363° C. In Comparative Example 1, in contrast, the temperature is 343° C., which differs by about 20° C. from those in Examples 1 to 5. The oxidative degradation and the thermal decomposition of the resin are chemical reactions, and the reaction speeds of the chemical reactions are exponentially increased as the temperature increases. From the viewpoint of reaction kinetics, therefore, a temperature difference of 20° C. at the high temperature is a significant difference.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

wherein a molar concentration (Y/Z) of a lactone ring molar content (Y) to a sum (Z) of a carboxylic acid molar content (X) and the lactone ring molar content (Y) is not less than 63 mol %,
the method comprising:
[I] saponifying an ethylene-vinyl ester copolymer to provide an ethylene-vinyl alcohol copolymer intermediate product;
[II] chemically treating the ethylene-vinyl alcohol copolymer intermediate product with a chemical treatment liquid; and
[III] drying the chemically treated ethylene-vinyl alcohol copolymer intermediate product;
wherein a monovalent carboxylic acid concentration of the chemical treatment liquid is 1 to 50000 ppm in the chemical treatment [II];
wherein a weight-based ratio of the monovalent carboxylic acid concentration to a metal ion concentration (monovalent carboxylic acid concentration/metal ion concentration) is 13 to 100 in the chemical treatment liquid in the chemical treatment [II]; and
wherein the metal ion in the chemical treatment liquid is a metal ion of carboxylic acid metal salt.

2. The ethylene-vinyl alcohol copolymer production method according to claim 1, wherein the chemical treatment [II] of chemically treating the ethylene-vinyl alcohol copolymer intermediate product with the chemical treatment liquid includes preparing a plurality of chemical treatment liquids having different carboxylic acid concentrations, and chemically treating the ethylene-vinyl alcohol copolymer intermediate product with the respective chemical treatment liquids on multiple stages, wherein the weight-based ratio of the monovalent carboxylic acid concentration to the metal ion concentration (monovalent carboxylic acid concentration/metal ion concentration) is 13 to 100 in a chemical treatment liquid having the highest monovalent carboxylic acid concentration among the plurality of chemical treatment liquids.

3. The ethylene-vinyl alcohol copolymer production method according to claim 1, wherein the drying [III] is performed at a drying temperature of 80° C. to 150° C.

4. An ethylene-vinyl alcohol copolymer comprising
an ethylene unit and a vinyl alcohol unit as monomer units, and
a carboxylic acid group and a lactone ring group present at terminals thereof,
wherein a molar concentration (Y/Z) of a lactone ring molar content (Y) to a sum (Z) of a carboxylic acid molar content (X) and the lactone ring molar content (Y) is not less than 63 mol %, and
wherein the ethylene-vinyl alcohol copolymer does not comprise a 1,2-diol structure at a side chain thereof.

5. The ethylene-vinyl alcohol copolymer production method according to claim 1, wherein the ethylene-vinyl alcohol copolymer does not comprise a 1,2-diol structure at a side chain thereof.

6. The ethylene-vinyl alcohol copolymer according to claim 4, wherein the sum (Z) of the carboxylic acid molar content (X) and the lactone ring molar content (Y) is 0.01 to 0.3 mol % based on a total amount of the monomer units of the ethylene-vinyl alcohol copolymer.

7. The ethylene-vinyl alcohol copolymer according to claim 4, wherein the lactone ring molar content (Y) is 0.01 to 0.3 mol % based on a total amount of the monomer units of the ethylene-vinyl alcohol copolymer.

8. The ethylene-vinyl alcohol copolymer according to claim 4, wherein the carboxylic acid molar content (X) is 0.01 to 0.3 mol % based on a total amount of the monomer units of the ethylene-vinyl alcohol copolymer.

9. A resin composition comprising the ethylene-vinyl alcohol copolymer according to claim 4.

10. A multilayer structure comprising at least one layer comprising the ethylene-vinyl alcohol copolymer according to claim 4.

11. A multilayer structure comprising at least one layer comprising the resin composition according to claim 9.

* * * * *